(12) United States Patent
Cirkel et al.

(10) Patent No.: US 6,753,933 B2
(45) Date of Patent: Jun. 22, 2004

(54) ERASABLE BISTABLE DISPLAY

(75) Inventors: Peter Albert Cirkel, Eindhoven (NL); Petrus Cornelis Paulus Bouten, Eindhoven (NL); Peter Jan Slikkerveer, Eindhoven (NL); Giovanni Nisato, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/227,696

(22) Filed: Aug. 26, 2002

(65) Prior Publication Data

US 2003/0043317 A1 Mar. 6, 2003

(30) Foreign Application Priority Data

Aug. 29, 2001 (EP) .............................................. 01203257

(51) Int. Cl.⁷ ............................................ G02F 1/1334
(52) U.S. Cl. ............................ 349/23; 349/86; 349/160
(58) Field of Search .......................... 349/23, 86, 160, 349/84, 12, 168, 169, 176.2, 3, 25

(56) References Cited

U.S. PATENT DOCUMENTS

| 6,104,448 A | * | 8/2000 | Doane et al. .................. 349/12 |
| 6,559,918 B1 | * | 5/2003 | Lueder ......................... 349/172 |
| 2003/0071958 A1 | * | 4/2003 | Wu et al. ..................... 349/156 |

FOREIGN PATENT DOCUMENTS

JP 127683 A 5/2000 ............. B43L/1/04

* cited by examiner

*Primary Examiner*—Karl D. Frech
*Assistant Examiner*—Daniel Walsh

(57) ABSTRACT

A bistable liquid crystal display device can be erased by the application of a mechanical pressure P at a section 20 of the display. The pressure induces a flow of the liquid crystal (5) material into an expansion chamber (22). The induced flow causes a transition from the non-reflecting to the reflecting state, thus eliminating the necessity of high voltage erasing voltages.

6 Claims, 3 Drawing Sheets

ERASABLE BISTABLE DISPLAY

The invention comprises a liquid crystal display device, which is switchable between a first optical modus and a second optical modus, the display device having a first section and at least part of a display screen being erasable by applying a pressure to the first section.

A bistable liquid crystal display device is disclosed in JP-2000127683. The display is applied in an electronic whiteboard. Whiteboards are used during meetings to write information on. Later the information is scanned and can be printed. A Liquid Crystal Display (LCD) of the polymer stabilized cholesteric texture type (PSCT) is applied for the section of the board which is used to write on. PSCT displays are switchable between a reflective and a transmissive mode. JP-2000127683 discloses that information displayed on such a display can be erased by exerting an external mechanical pressure by means of e.g. a pen. Due to the mechanical pressure, a transition is induced in the liquid crystal fluid as a consequence of which the transmissive state (modus) is changed locally into the reflective state (modus). This phenomenon is used to erase information displayed on the device. Since the pressure is locally exerted the erasing effect also takes place locally and consequently only a small part of the display is erased.

It is an object of the invention to provide a display device in which it is possible to erase information displayed on the device over larger areas or even the whole display area by means of a mechanical pressure. The display device according to the invention is characterized in that the device is provided with an expansion chamber for storing an excess of fluid caused to flow into the expansion chamber by the applied pressure, the fluid flow thus erasing information displayed on the display in a second section of the display device, which is located between the first section and the expansion chamber. The inventors have realized that if the display device is adapted such that a flow of liquid crystal material is caused to occur, this flow may advantageously be used for erasing the whole display area. In view of the presence of the expansion chamber a flow of liquid crystal material from the point of pressure to the expansion chamber will occur and a shear force will act on the liquid crystal. The liquid crystal material becomes ordered in the planar (reflecting) state over the whole area of the display where fluid flow occurs, i.e. the phase transition from the transmissive to the reflective mode occurs and hence the displayed information is erased. Consequently no high electrical erasing voltage is required anymore.

This aspect as well as other aspects of the invention are defined by the independent claims.

Advantageous embodiments of the invention are defined in the dependent claims.

These and other aspects of the invention will be elucidated with reference to the embodiments described hereinafter.

In the drawings.

The figures are not drawn to scale. In general, identical components are denoted by the same reference numerals in the figures.

Figure 1A:
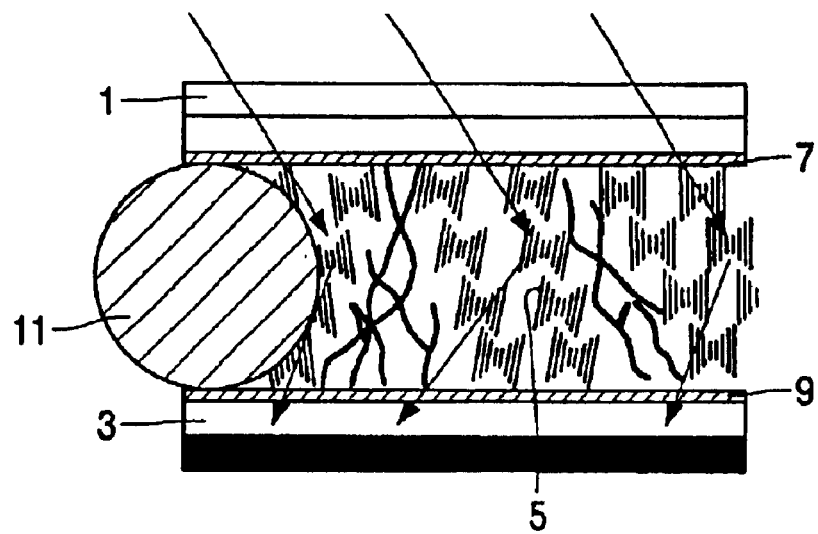
FIGS. 1A and 1B show a cross-section of a bistable liquid crystal display device being switchable between a transmissive state and a reflective state, respectively.
Figure 1B:
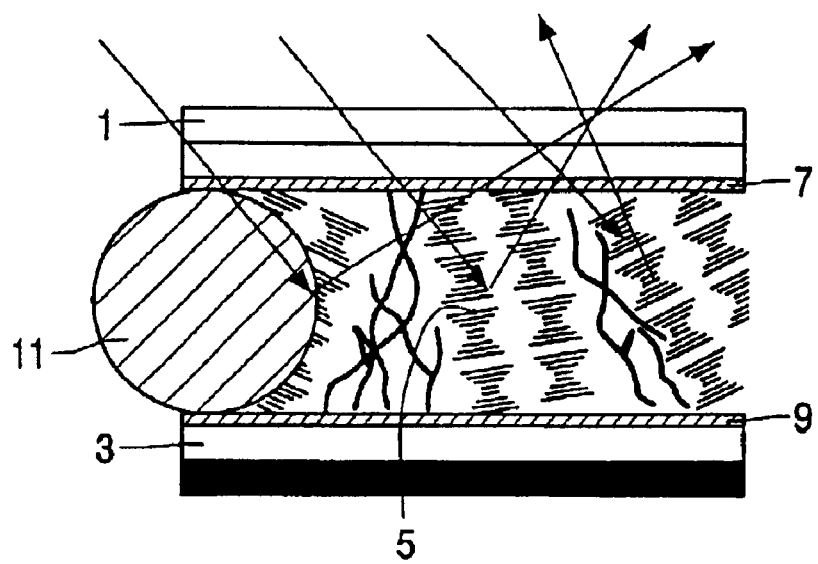

FIGS. 1A and B show a cross-section of a bistable liquid crystal display device. The device comprises two substrate plates 1 and 3 between which a cholesteric texture liquid crystal (CTLC) material 5 is positioned. Inner surfaces 7 and 9 of the substrate plates 1 and 3 are provided with a transparent electrically conductive material to form two sets of electrodes. The device further comprises distance elements or spacers 11 to keep the two substrate plates at a well-defined distance from each other. The CTLC material 5 can be switched between a transmissive state as indicated in FIG. 1A and a reflective state as is indicated in FIG. 1B by applying a voltage on the electrodes 7 and 9. Displays based on CTLC require a relatively high switching voltage, typically at least 30 V, therefor also requiring relatively expensive driving IC's. Furthermore, energy is lost when low (battery-) voltage is transformed to this high voltage level.

Figure 2:
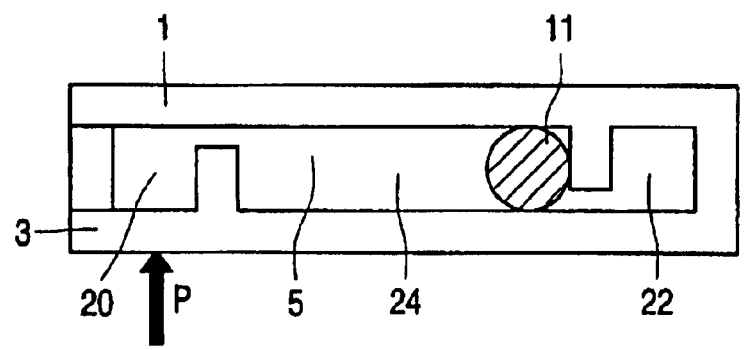
FIG. 2 shows a cross-section of an embodiment of a display device according to the invention.

FIG. 2 shows a cross-section of an embodiment of the display device according to the invention. The display comprises a second section 24 on which information can be displayed, a first section 20 on which a mechanical pressure P can be exerted and an expansion chamber 22. CTLC material 5 is positioned between substrate plates 1 and 3. The device further comprises distance elements 11 to keep the substrate plates at a well-defined distance, typically in the order of 5 micron. The display can be switched from a reflecting state to a transmitting state by applying a certain voltage. In this way, the liquid crystal material changes from a planar to a so-called focal conic state. Applying a higher voltage can switch the display from the non-reflecting to the reflecting state. This is because the focal conic (non-reflecting) state changes into a so-called homeotropic state, which after removal of the voltage relaxes to the planar (reflecting) state. Usually not just a simple voltage but a certain sequence of pulses is used for the driving of the display. This has advantages such as speeding-up the driving and preventing the display material from degrading. A typical device can be driven from the reflecting state to the non-reflecting state at a voltage above 10 V and from the non-reflecting to the reflecting state at a voltage above about 34 V. These voltages are relatively high and can be decreased by reducing the cell gap. A reduction of the cellgap however, is accompanied by a reduction of the reflectivity of the reflective state. This in turn reduces the display performance, i.e. the brightness and contrast of the display.

The inventors have realized that a transition from the non-reflecting to the reflecting state also occurs if a shear force acts on the liquid crystal. Shear forces, which make the liquid crystal flow, are induced by a mechanical pressure P acting on the display. Applying pressure has the advantage that no high electrical voltage is required anymore for erasing the display.

In displays with rigid substrates a large force has to be applied on the display, therefore preferably flexible substrates are used, e.g. plastic substrates with a thickness <200 micron for at least part of the display. Flexibility of the substrates can be best expressed in terms of the bending radius, which is a function of both the substrate thickness and the Young (Elasticity) modulus of the used substrate material. The substrate can elastically be bent to this radius. Good results were obtained with substrates having a bending radius of 100 cm or less.

Figure 4:
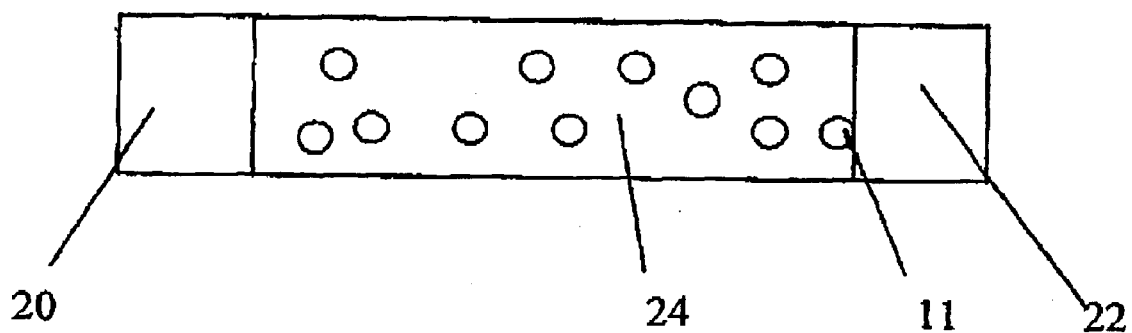
FIG. 4 shows a representative top view of the embodiment of FIG. 2.

Flexibility of the first section 20 and the expansion chamber 22, and thus the occurrence of the flow of liquid crystal fluid, can be improved by applying fewer spacers 11 in these sections as compared to the density of spacers as applied in the second section 24. This also increases the stiffness of the display section 24, consequently improving the erasing effect since the fluid flow towards the expansion chamber 22 is improved. Since sections 20 and 22 are flexible (i.e. compressible and expandable) and are filled with liquid crystal, applying a pressure on section 20 will lead to a compression of that section and excess fluid will flow to the expandable section 22 via the display section 24, where the shear erases the orientation of the liquid crystal. The fluid can easy flow around the spacers, as is evident from the representative top view of the device shown in FIG. 4.

The spacers in the display section 24 are preferably fixed to both substrates 1 and 3, since this will prevent any displacement of the spacers and thus will assure a constant distance between the substrates 1 and 3. Such spacers may be made by a lithographic process. An additional measure is the use of rib-like spacers in the display area 24. This has the advantage of enhancing the flow pressure section 20 to the expansion chamber 22. Rotations and/or inclinations of the device will not lead to any flow of liquid crystal since gravity alone is much to small to expand/compress sections 20 and 22.

CTLC displays do occur in two types depending upon the stabilization of the textures between which the display can be switched: polymer stabilized (PSCT) or surface stabilization (SSCT). It has been found that the type of stabilization of the liquid crystal plays a role in the erasing effect. In polymer stabilized CTLC (PSCT) the polymer network hampers the free flow of liquid crystal. It is therefor preferred to use surface stabilized CTLC.

An example of a display in which the effect has been demonstrated has 5 micron spherical spacers at a density of $100/mm^2$, dispersed between two plastic substrates with a Young modulus of 1.6 GPa and a thickness of 200 micron.

Figure 3:
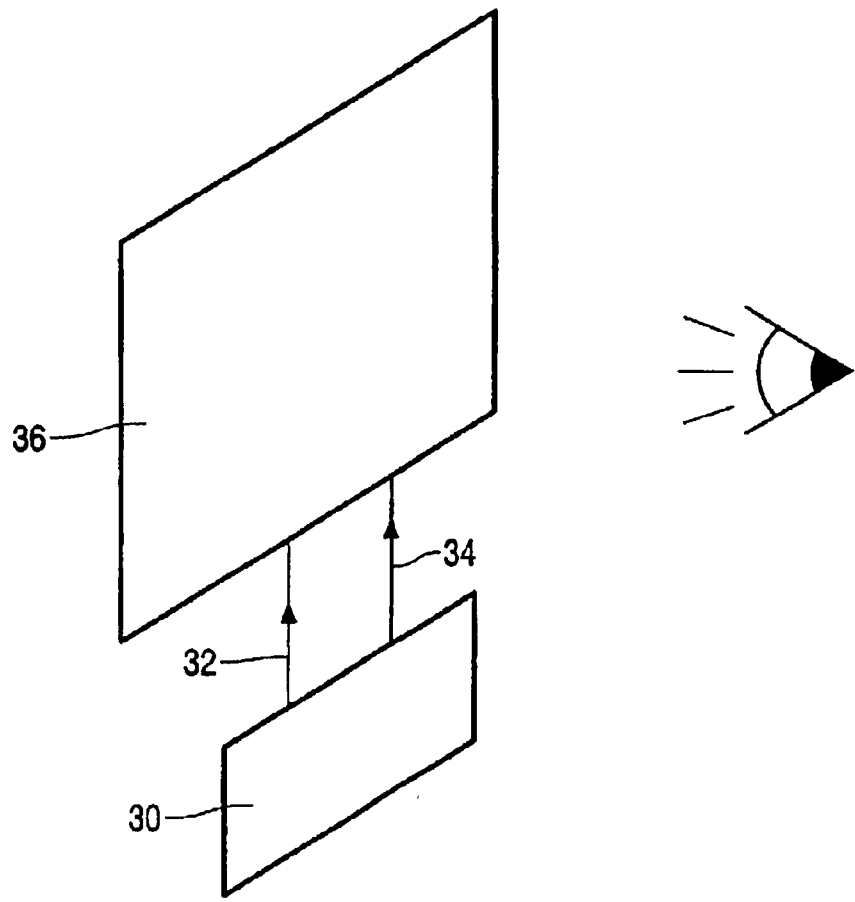
FIG. 3 shows a display apparatus according to the invention.

FIG. 3 shows a display apparatus according to the invention, comprising the display device according to the invention and means 30 for providing control signals 32 and display signals 34 to the display device.

In summary, the invention comprises a bistable liquid crystal display device which can be erased by the application of a mechanical pressure P. The pressure induces a flow of the liquid crystal 5 material to an expansion chamber 22. The induced flow causes a transition from the non-reflecting to the reflecting state, thus eliminating the necessity of high voltage erasing voltages.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The word "a" or "an" preceding an element does not exclude the presence of a plurality of such elements.

What is claimed is:

1. A liquid crystal display device, which is switchable between a first optical modus and a second optical modus, the display device having a first section and at least part of the display device being erasable by applying a pressure P to the first section, wherein the display device is provided with an expansion chamber for storing an excess of liquid crystal fluid caused to flow into the expansion chamber by the applied pressure P, the fluid flow thus erasing information displayed on the display in a second section of the display, which is located between the first section and the expansion chamber.

2. A display device according to claim 1, wherein the first optical modus comprises a transparent modus and the second optical modus comprises a reflective modus.

3. A display device according to claim 1, wherein the display comprises a substrate plate having a bending radius of 100 cm or less.

4. A display device according to claim 1, wherein the first section, the second section, and the expansion chamber comprise distance elements having respective densities, the density of distance elements in the expansion chamber and/or in the first section being equal to or smaller than the density of distance elements in the second section.

5. A display device according to claim 1, wherein the liquid crystal comprises a surface stabilized cholesteric texture liquid crystal (CTLC).

6. The device of claim 1, including means for providing control signals and display signals to the display device.

* * * * *